United States Patent
Lin

(10) Patent No.: US 7,970,969 B2
(45) Date of Patent: Jun. 28, 2011

(54) METHOD FOR COMMUNICATION ON A MULTIDROP BUS OF A MAGNETIC RESONANCE SYSTEM

(75) Inventor: Jia Yu Lin, Shenzhen (CN)

(73) Assignee: Siemens Aktiengesellschaft, Munich (DE)

( * ) Notice: Subject to any disclaimer, the term of this patent is extended or adjusted under 35 U.S.C. 154(b) by 876 days.

(21) Appl. No.: 11/912,401

(22) PCT Filed: Apr. 26, 2006

(86) PCT No.: PCT/EP2006/061836
§ 371 (c)(1),
(2), (4) Date: Oct. 24, 2007

(87) PCT Pub. No.: WO2006/114425
PCT Pub. Date: Nov. 2, 2006

(65) Prior Publication Data
US 2010/0199004 A1    Aug. 5, 2010

(30) Foreign Application Priority Data

Apr. 28, 2005 (CN) .......................... 2005 1 0066545

(51) Int. Cl.
*G06F 13/42* (2006.01)
(52) U.S. Cl. .......................... 710/105; 710/107; 710/305
(58) Field of Classification Search .......... 710/300–315, 710/104–110; 709/201, 227–229; 370/254.474, 370/392, 254, 474
See application file for complete search history.

(56) References Cited

U.S. PATENT DOCUMENTS

| | | | | |
|---|---|---|---|---|
| 4,827,477 A | * | 5/1989 | Avaneas | 714/757 |
| 5,187,708 A | * | 2/1993 | Nakatani et al. | 370/469 |
| 6,434,617 B1 | | 8/2002 | Clough et al. | |
| 6,629,084 B1 | * | 9/2003 | Kabacaolgu et al. | 705/401 |
| 6,654,355 B1 | | 11/2003 | Marbach et al. | |
| 6,718,362 B1 | * | 4/2004 | Beadle et al. | 709/201 |
| 6,728,268 B1 | * | 4/2004 | Bird | 370/474 |
| 6,799,318 B1 | * | 9/2004 | Davison et al. | 719/328 |
| 7,089,343 B2 | * | 8/2006 | Bahren | 710/306 |
| 7,120,725 B2 | * | 10/2006 | Sandy et al. | 710/314 |
| 7,284,060 B2 | * | 10/2007 | Davison et al. | 709/227 |
| 7,333,504 B2 | * | 2/2008 | Nichols | 370/447 |
| 7,386,716 B2 | * | 6/2008 | Fredriksson | 713/151 |
| 7,443,885 B2 | * | 10/2008 | Slivkoff et al. | 370/474 |
| 7,496,050 B2 | * | 2/2009 | Itoi | 370/254 |
| 7,506,344 B2 | * | 3/2009 | Davison et al. | 719/328 |
| 7,620,047 B2 | * | 11/2009 | Sandy et al. | 370/392 |
| 7,650,323 B2 | * | 1/2010 | Hesse et al. | 706/62 |
| 7,742,496 B2 | * | 6/2010 | Nichols | 370/447 |
| 2004/0122978 A1 | | 6/2004 | Bird | |

* cited by examiner

*Primary Examiner* — Raymond N Phan
(74) *Attorney, Agent, or Firm* — Schiff Hardin LLP

(57) ABSTRACT

In a method of communication on a multidrop bus of a magnetic resonance system, an adaptive protocol script for telegrams on the multidrop bus is used, that implements adaptive protocol matching using telegram start characters, addresses and frame-type binding. For this purpose, a telegram frame is divided into a link layer and a service layer, the link layer being device-based and being responsible for differentiating addresses and frame types, and enabling devices that use different communication protocols to be simultaneously present on the bus. The service layer represents the load of the link layer, and its service script is operation-based, and the service layer provides, for the exterior, interfaces that are independent of the communication protocols used by the devices.

21 Claims, 5 Drawing Sheets

FIG 2

| Stx | UnitNo [2] | Service Layer PayLoad | Etx | FCS [2] | Delimiter [0-2,*] |

FIG 3

| SubAddr [0-2] | SvcType [0-1] | IssueKey [0,2,4,*] | DataLen [0,1,2,4] | FlexData [*] |

FIG 4

| SubAddr [0-2] | SvcType [0-1] | IssueKey [0,2,4,*] | RespCode [0,2,4] | FlexData [*] |

FIG 5

| APSTOMB Fields | Fields of Sr253/80/90 | Fields of SR73/74A | Fields of E5AK...EK | Fields of CompoWF | Fields of Sysway | Fields of ModBus ASCII |
|---|---|---|---|---|---|---|
| Stx | StartChar | StartChar | StartChar | Stx | StartChar | StartChar |
| UnitNo [2] | MachAddr [2] | MachAddr [2] | UnitNo [2] | NodeNo [2] | NodeNo [2] | Address [2] |
| SubAddr [0-2] | SubAddr | | | SubAddr [2] | | |
| SvcType[0-1] | CmdType | | CmdType | SID | | |
| IssueKey [0,2,4,*] | DataAddr [4] | CmdCode [2] | Param [2] | MRC [2] | HeadCode [2] | Function [2] |
| | | | | SRC [2] | DataCode [2] | |
| | | | | VarTye [0,2] | | |
| | | | | DataAddr [0,2,4] | | |
| | | | | BitAddr [0,2] | | |
| DataLen [0,1,2,4] | Length | | | Length [4] | | |
| FlexData[*] | Data[*] | Data[*] | Data [4] | Data[*] | Text[*] | Text[0-252] |
| Etx | TxEndChar | EndChar | | Etx | | |
| FCS [2] | BCC [2] | BCC [2] | FCS [2] | BCC | FCS [2] | LRC [2] |
| Delimiter [0-2,*] | Delimiter [1-2] | Terminator | Terminator [2] | | Terminator [2] | Terminator [2] |

FIG 6

| APSTOMB Fields | Fields of Sr253/80/90 | Fields of SR73/74A | Fields of E5AK...EK | Fields of CompoWF | Fields of Sysway | Fields of ModBus ASCII |
|---|---|---|---|---|---|---|
| Stx | StartChar | StartChar | StartChar | Stx | StartChar | StartChar |
| UnitNo [2] | MachAddr [2] | MachAddr [2] | UnitNo [2] | NodeNo [2] | NodeNo [2] | Address [2] |
| SubAddr [0-2] | SubAddr | | | SubAddr [2] | | |
| SvcType[0-1] | CmdType | | CmdType | SID | | |
| IssueKey [0,2,4,*] | | CmdCode [2-3] | Param [2] | MRC [2] SRC [2] | HeadCode [2] | Function [2] |
| RespCode [0,2,4] | RespCode [2] | RespCode [2] | EndCode [2] | RespCode [4] | EndCode [2] | |
| FlexData[*] | Data[*] | Data[*] | Data [4] | Data[0,8,16] | Text[*] | Text[0-252] |
| Etx[0-1] | TxEndChar | EndChar | | Etx | | |
| FCS [0,2] | BCC [2] | BCC [2] | FCS [2] | BCC | FCS [2] | LRC [2] |
| Delimiter [0-2,*] | Delimiter [1-2] | Terminator | Terminator [2] | | Terminator [2] | Terminator [2] |

METHOD FOR COMMUNICATION ON A MULTIDROP BUS OF A MAGNETIC RESONANCE SYSTEM

BACKGROUND OF THE INVENTION

1. Field of the Invention

The present invention relates to a method of communication on a multidrop bus of a magnetic resonance system, and, more particularly, it relates to a multidrop bus telegram adaptive protocol script (Adaptive Protocol Script For Telegram Over Multidrop Bus, abbreviated below to APSTOMB) communication method which is used in a magnetic resonance system.

2. Description of the Prior Art

Currently, in order to strictly maintain the operating environment of a scanner in a permanent-magnet magnetic resonance system, the usual practice is that many control channels or monitoring channels are used to effect regulation and state monitoring of physical parameters such as the magnet temperature, etc. for a monitoring target.

When there are different monitoring target circumstances, separate management using independent monitoring units is usually conducted in the system, since the monitored parameters needed for different monitoring targets vary, but there are the following drawbacks in this type of system:

It is difficult to obtain monitoring units possessing similar functions, and the system requires that many modules be managed, so making the cost high;

the increase of the modules leads to an increase of the complexity of failure modes, and so the cost of investigations into failure mode analysis (Failure Mode and Effects Analysis, FMEA), is increased;

the increase of hardware lowers the reliability of interrelations between components, and increases the hardware failure rate, so leading to a reduction of the mean time between failure (MTBF); and since the communication protocols of the components of different companies differ, it is not possible to interconnect identical interfaces using a single bus, and it is difficult to achieve integration and embedding.

In situations in which one and the same monitoring target has many monitoring channels, usually, regulators (or monitoring units) which are of the same type are employed. Since different monitoring points are necessarily subject to differences of monitoring parameter characteristics, the use of such independent monitoring modules has the following drawbacks:

High precision needs to be used for all the regulators (or monitoring units), and costs are very high;

some monitoring points are under quite highly sensitive control, and it is difficult to conduct work in coordination with other channels;

it is difficult for the functions of regulators (or monitoring units) to keep up with the technological innovations of products, and it is necessary to use new types of regulators (or monitoring units) in order to adapt to rapid edition upgrades; and the type selection range for the regulators (or monitoring units) is small, and it is difficult to keep pace with the supply of spares and changes in commercial supplies.

In some magnetic resonance systems a regulator (or monitoring unit) offline operation arrangement is used in order to avoid the above two drawbacks, but there are the following problems in such a system:

The regulators (or monitoring units) are not connected to the system and, in abnormal circumstances, it is not possible to ascertain in real time whether parameter changes have affected the image quality;

it is not possible for system maintenance staff to conduct highly efficient inspection and measurement work.

There are also some systems in which, in order to avoid the above drawbacks, bus communication is not used, and a communication mode with arrival points reaching monitoring units at many points is used for regulators (or monitoring units), but there are still some problems with such a system:

The large number of physical connections increases the cost of the hardware; and the large number of physical connections increases the hardware failure rate and reduces the mean time between failure.

SUMMARY OF THE INVENTION

An object of the present invention is to provide a method of communication on a multidrop bus of a magnetic resonance system, and it uses an adaptive protocol for telegrams on a multidrop bus (Adaptive Protocol Script For Telegram Over Multidrop Bus, referred to below as APSTOMB) in order to resolve the problems when monitoring units of many different types are co-present on one and the same bus and conduct multipoint communication with a main control unit.

The magnetic resonance multidrop bus communication method of the invention uses an adaptive protocol script for telegrams on a multipoint bus, and this adaptive protocol script for telegrams on a multipoint bus effects adaptive protocol matching by means of telegram start characters, addresses and frame type binding; in the method, a telegram frame is decomposed into a link layer and a service layer. The link layer is device-based, is responsible for distinguishing addresses and frame types and allows devices using different communication protocols to be co-present on the bus, and the service layer constitutes the link layer's load, its telegram script is service-based and it provides, for the exterior, interfaces which are independent of the communication protocols which are used by the various devices.

Within these layers, a composer determines telegram headers on the basis of the above noted start characters and addresses. The link layer is further responsible for confirming the completeness of telegrams.

A frame of the link layer comprises a start character field, which serves to identify the start of a telegram; at the time of transmission, a composer inserts a correct start character in the telegram head portion; when preparation for reception is complete, a valid start character indicates the header of a telegram. A frame of the link layer also contains a unit address field, which serves to indicate a logical channel address. A frame of the link layer also contains a service layer load field, whose text indicates a regulator's work request or a return result, and, at the time of transmission, the composer inserts the load text of the entire field into this service load field of the telegram. A frame of the link layer also contains a main text end character field, which serves to indicate that the service load field has ended, and, at the time of reception, an analyzer can scan to as far as the main text end character, and so can extract the service layer load. A frame of the link layer also contains a check word field, which serves to confirm the correctness of the telegram of the relevant frame. A frame of the link layer also contains a telegram end character field, which serves to identify the end of the complete telegram.

The service layer is divided into the two types, request telegrams and feedback telegrams, according to the difference between the directions of the telegrams. The service layer's request telegrams and feedback telegrams contain sub-address fields, which are used to support plural channels. The service layer's request telegrams and feedback telegrams also contain service type fields, which serve to indicate types of services. The service layer's request telegrams and feedback telegrams also contain transaction word fields, which serve to indicate service codes. The service layer's request telegrams also contain data specification fields, which serve to designate the data specifications which are carried by service layer requests. The service layer's feedback telegrams also contain response code fields, which serve to indicate the types of service response results. The service layer's request telegrams and feedback telegrams also contain flexible data fields, which are used to indicate variable data.

At the time of composition of a telegram, the telegram is produced by a series of insertion operations, each field of the service layer corresponds to an insertion operation and composes a service layer load field, and the service layer load fields constitute a composite field which is inserted into the link layer. At the time of telegram analysis, the telegram is processed by a series of extraction operations. Each field of the service layer corresponds to an extraction operation and is extracted at the time of analysis of the service layer load fields.

Further, the adaptive protocol script checks out telegrams on the link layer. The adaptive protocol script further uses matching operations to effect matching in correspondence to the checked telegrams, and thereby recognize different regulators. When a regulator is recognized as the result of checking-out and matching, its protocol frame type is bound to an address. A main control unit has a list of regulator frame types, and, when it connects to and accesses the relevant address, it can effect frame state binding on the basis of the frame type composite telegram.

BRIEF DESCRIPTION OF THE DRAWINGS

FIG. 2 is a schematic of the link layer frame format in the frame layer division technique of the multidrop bus telegram adaptive protocol script which is used in the method of the invention for communication on a multidrop bus of a magnetic resonance system.

FIG. 3 is a schematic of the service layer request frame format in the frame layer division technique of the multidrop bus telegram adaptive protocol script which is used in the method of the invention for communication on a multidrop bus of a magnetic resonance system.

FIG. 4 is a schematic of the service layer feedback frame format in the frame layer division technique of the multidrop bus telegram adaptive protocol script which is used in the method of the invention for communication on a multidrop bus of a magnetic resonance system.

FIG. 5 is a schematic of the patterning for some protocol request telegrams by the multidrop bus telegram adaptive protocol script which is used in the method of the invention for communication on a multidrop bus of a magnetic resonance system.

FIG. 6 is a schematic of the patterning for some protocol feedback telegrams by the multidrop bus telegram adaptive protocol script which is used in the method of the invention for communication on a multidrop bus of a magnetic resonance system.

DESCRIPTION OF THE PREFERRED EMBODIMENTS

The telegrams of a variety of mainstream ASCII-coded centralized communication regulators (or monitoring units) all use start characters to bind unit address formats. The present invention's adaptive protocol script for telegrams on a multidrop bus of a magnetic resonance system (Adaptive Protocol Script For Telegram Over Multidrop Bus, abbreviated below to APSTOMB) resolves adaptation problems by means of start character and main address binding for frame types, makes it possible for regulators (or monitoring units) which use a variety of different protocols to work together, and achieves multipoint communications.

Figure 1:
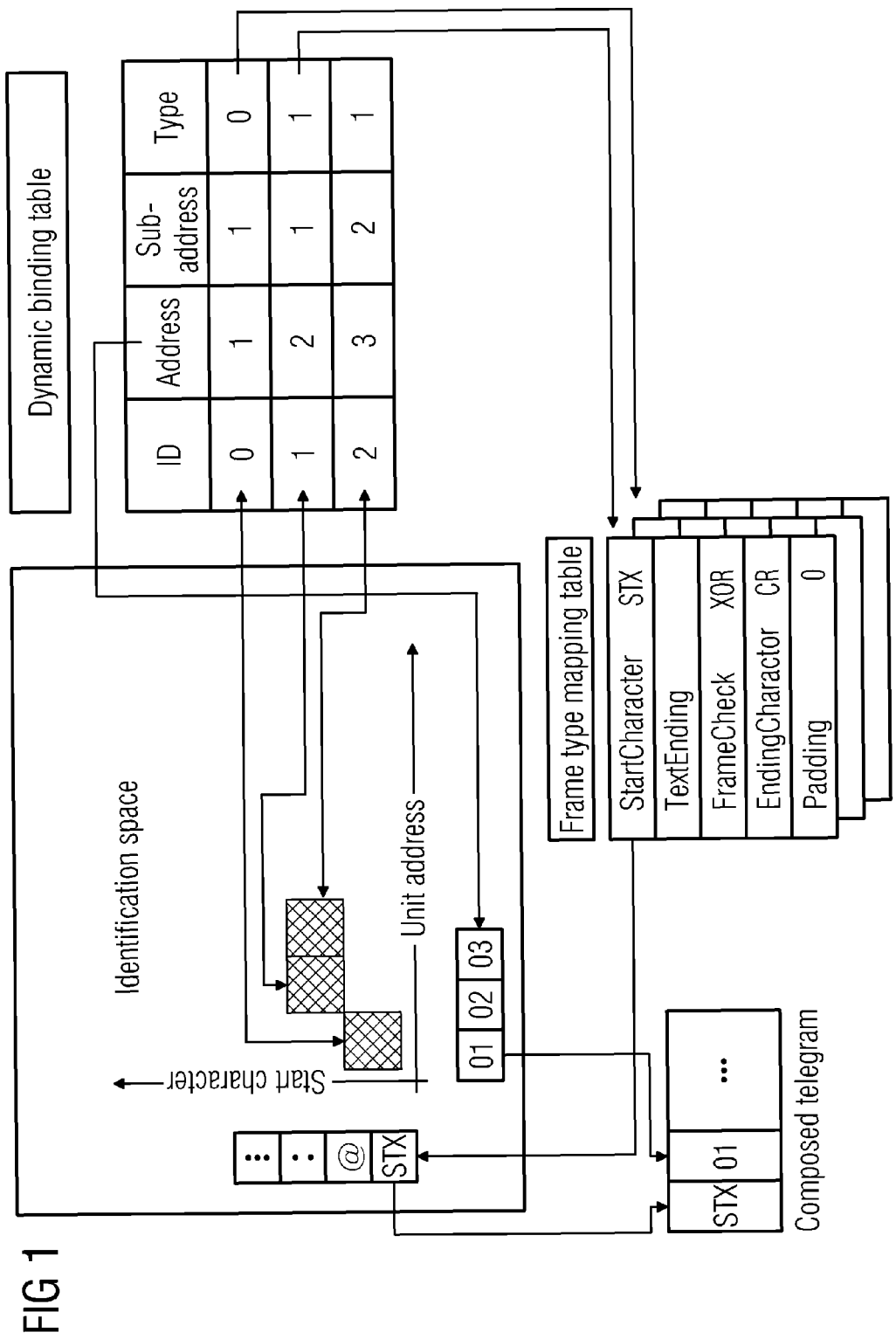
FIG. 1 is a schematic of frame type binding by the multidrop bus telegram adaptive protocol script which is used in the method of the invention for communication on a multidrop bus of a magnetic resonance system.

Referring to FIG. 1, this shows the use of "start character+ address+frame type" binding to effect mapping. In the drawing, the cross-hatched squares in the identification space correspond to the personal identification (ID) of a regulator (or monitoring unit) dynamic binding table. The dynamic binding table here is a search table which is maintained by software, and each entry in the table corresponds to one logical channel. This mapping scheme ensures that the dynamic binding table gives one-to-one mappings in the identification space, and their relations in two directions are all unique. In the identification space, each logical channel corresponds to a cross-hatched square. As indicated by the arrow-headed dashed lines, each cross-hatched square corresponds to a unique ID. Each entry in the dynamic binding table also contains necessary address search information and regulator type information. The descriptors of the frame type mapping table comprise a start character, a main text end character, a frame check, a telegram end character, and the number of tail additional words, so permitting a composer to ascertain the specific format of a communication frame. In the identification space shown in the drawing, a start character and an address determine the telegram header.

Referring to FIGS. 2-4, the above described frame type binding is implemented by means of a frame layer division scheme. A telegram frame is decomposed into two layers, one of which is a link layer, whose format is as shown in FIG. 2, and the other of which is a service layer, whose request frame format and feedback frame format are respectively shown in FIG. 3 and FIG. 4.

The link layer is responsible for specifying addresses and frame types, and valid locations allow regulators (or monitoring units) using different protocols to be co-present on a bus. It is also responsible for confirming the completeness of telegrams. The service layer constitutes the load of the link layer, its service script can be concisely operation-oriented, and it can provide, for the exterior, interfaces which are irrespective of equipment.

The items indicated in square brackets in FIGS. 2-4 are field design lengths (numbers of bytes, the items containing * being fields of dynamically varying length, and the others without an indication being 1).

Referring to FIG. 2, the first two fields of the link layer in this layer division scheme constitute an identification region. The frame of the link layer here is constituted by 6 fields, these being: a start character (Stx), a unit No. (UnitNo, also called unit address), service layer load (Service Layer Payload, abbreviated below to SLP), a main text end character (Etx), a frame check word (FCS) and a telegram end character (Delimiter). Within these, Stx serves to identify the start of a telegram: at the time of transmission, a composer inserts a correct start character into the telegram header portion: when preparation for reception is complete, a valid Stx indicates the header of a telegram. After Stx has been received, the processing for the succeeding fields varies, because of differences in operating modes. Referring jointly to FIG. 1, UnitNo is the unit address in FIG. 1, and UnitNo is also the main address of a logical channel. A logical channel may also require the specification of a sub-address, but since this link layer does not contain a sub-address, the procedure which is described in detail later is implemented for the sub-address in question. The service layer load SLP is the link layer's main text, and a service layer load text indicates a regulator work request or a return result. At the time of transmission, the composer inserts the entire load text in the telegram's SLP field. The main text end character Etx serves to indicate that SLP has ended. At the time of reception, an analyzer can scan to as far as the main text end character, and so can extract the service layer load. The frame check word FCS serves to confirm the correctness of the relevant frame telegram, calculation procedure being specified for the frame check method here. At the time of transmission, the composer uses calculation procedure to insert a check code; at the time of reception, the analyzer compares the result of calculation procedure and the check code. The telegram end character delimiter serves to indicate the end of the complete telegram.

Referring to FIG. 3 and FIG. 4, since the directions of telegrams differ, the service layer is divided into two types, request telegrams and feedback telegrams. The request frame and the feedback frame each consist of 5 fields. The request frame's fields are: sub-address (SubAddr), service type (SvcType), a transaction word (IssueKey), data specification (DataLen/DataSpec) and flexible data (FlexData). The feedback frame's fields are: sub-address (SubAddr), service type (SvcType), a transaction word (IssueKey) a response code (RespCode) and flexible data (FlexData). In order to achieve a requisite processing speed and adapt to storage space limitations, the definitions and the permissible lengths of the various fields are screened and selected by analysis and experiments. Within these fields, the sub-address SubAddr is the sub-address of a logical channel; a regulator which supports plural channels may need this field; alternatively, a regulator which supports a single channel can use a fixed code word to fill this field. The length of this field is made zero for regulators which do not require sub-addresses. The service type SvcType is used to indicate the type of operation. The transaction word IssueKey is used to indicate a service code, and decisions on the interpretation of this field are made by an analyzer. It is recommended that this field contain at least the following types of specifications: omission (OMIT), command code (CODE), addressing (ADDR), and name (NAME). Data specification DataSpec is used to specify the data standards which are carried by service layer requests; this field generally indicates the data length, and it can also be designated as DataLen. Decisions on the interpretation of this field are made by an analyzer, and it is recommended that this field contain at least the following types of specifications: omission (OMIT), character (CHAR), bihexadecimal code (2HEX) and 16-place integer (INT). In this case, the request telegram has a DataSpec field, and the feedback telegram has a DataSpec field. The response code RespCode is used to indicate the type of service response result. This field generally indicates whether a service request has been completed normally, and it can also indicate data length. Decisions on the interpretation of this field are made by an analyzer, and a recommended field contains at least the following types of specifications: omission (OMIT), character (CHAR), bihexadecimal code (2HEX) and 16-place integer (INT). If the request telegram does not have a RespCode field, the feedback telegram still has a RespCode field. Flexible data FlexData is used to indicate variable-length data, the mode of processing of the FlexData field is defined by a composer and an analyzer, and the specific text interpretation method is defined by a service script.

Reference is had to FIG. 5 and FIG. 6, in which FIG. 5 shows the method of protocol patterning of service layer request telegrams as in FIG. 3 for some regulators (or monitoring units) in the method of the invention, and FIG. 6 shows the method of protocol patterning of service layer feedback telegrams as in FIG. 4 for some regulators (or monitoring units) in the method of the invention.

Expansion of the telegram frame's link layer and service layer makes it possible to establish a correspondence with the various protocol fields of many types of regulators (or monitoring units). The use of a frame type register table makes it possible to cause the processing of each field to depend on the frame type. If telegram errors occur in telegram processing, the incorrect fields can be accurately located.

In FIG. 5 and FIG. 6, each column represents a protocol. The top line of the table list gives the names of various protocols, the leftmost column being APSTOMB, and various common definitions of regulator manufacturers or industrial standards being listed in the columns on the right. For example, column 2 indicates the protocol format of regulators such as SR253, SR80 and SR90, etc., column 3 indicates the SR73A and SR74A protocol format, column 4 indicates the protocol format of regulators such as E5AK and E5EK, etc., and column 7 indicates the ModBus ASCII protocol format. The communication scheme based on APSTOMB is not directly connected to these existing definitions or industrial standards, but it provides an adaptive processing capacity which enables generated telegrams to be respectively justified with other telegrams at field boundaries. For example, the IssueKey field of APSTOMB corresponds to what is a 4-place hexadecimal address in an SR90 series regulator, and the processing on the APSTOMB side is ADDR, ie it is represented by means of a 4-byte hexadecimal ASCII string; this field corresponds to a 2-place command code in an SR73A series regulator, and the processing on the APSTOMB side is CODE, ie it uses a 2-byte hexadecimal ASCII string; this field corresponds to the MRC, SRC, VarType, DataAddr and BitAddr fields of the Compo/WF standard, and the processing on the APSTOMB side is NAME, ie it uses a variable-length hexadecimal ASCII string; if this field does not exist in any protocol, the processing on the APSTOMB side is OMIT, ie it is omitted.

At the time of composition of an APSTOMB telegram, the telegram is produced by a series of insertion operations. Each field corresponds to an insertion operation. The service layer fields compose SLP, SLP being a composite field which is inserted in the link layer. At the time of analysis of an APSTOMB telegram, the telegram is processed by a series of extraction operations. Each field corresponds to an extraction operation. The service layer fields are extracted at the time of SLP analysis. The composition routine simply calls insertion operations in accordance with a fixed interface, and is not concerned with the details of insertion operation implementation. The analysis routine simply calls extraction operations in accordance with a fixed interface, and is not concerned with the details of extraction operation implementation. The insertion and extraction operations are separated into the various fields, and are provisionally called field operations. The composer and analyzer are based on a binding model. A frame type register table consists of a series of descriptors. Field operations effect insertion or extraction of information in accordance with the mode specified by the descriptors. The following pseudo-codes can be used to show the operating principle:

```
Insert IssueKey (...)
{
    ...//preparation
    Issue Type = SvcFrameDescriptors [CurrentTypeIndex]
    [REQ].CmdAddrCode;
    Issue = Services [CurrentTypeIndex]
    CurrentSvcIndex].Req.Issue;
    switch (IssueType)
    {
        case ISSUE_KEY_OMIT:
            //Omit this field.
            break;
        case ISSUE_KEY_CODE:
            ...//Insert command code.
            break;
        case ISSUE_KEY_ADDR:
            ...//Insert address.
            break;
        case ISSUE_KEY_NAME:
            ...//Insert ASCII transaction string.
            break;
    }
    ...//Complete other processing.
}
```

APSTOMB using the magnetic resonance system multidrop bus communication method of the invention effects frame type binding by means of the above described frame division technique.

Figure 7:
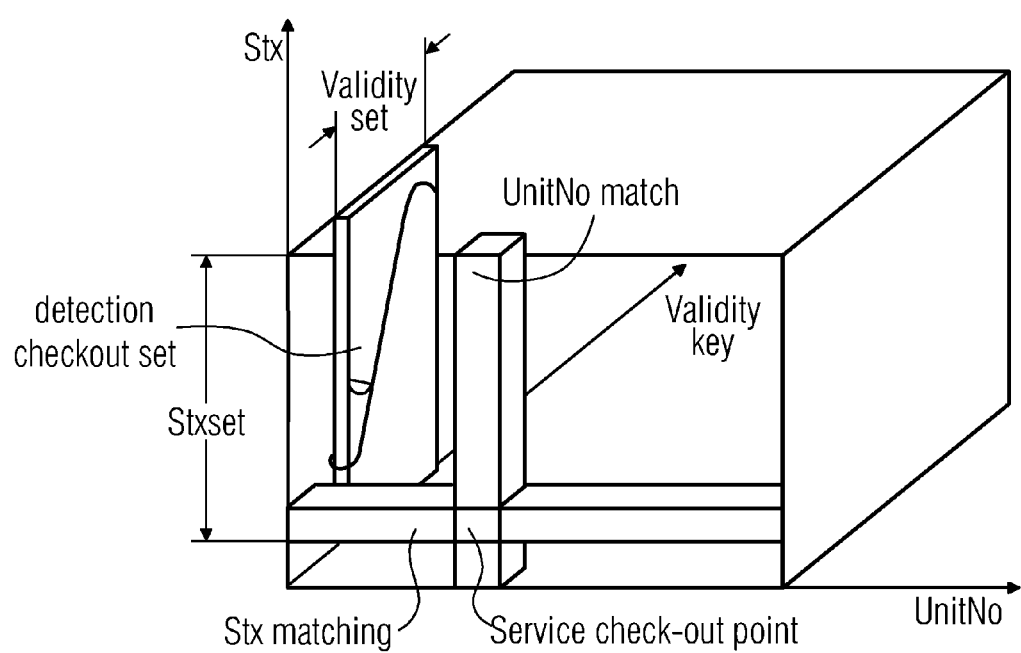
FIG. 7 is a schematic of frame telegram checking-out by the multidrop bus telegram adaptive protocol script which is used in the method of the invention for communication on a multidrop bus of a magnetic resonance system.

Referring to FIG. 7, APSTOMB using the magnetic resonance system multidrop bus communication method of the invention can also use a frame telegram checking technique to effect orthogonal and convolutional checking-out of telegrams.

The protocol of some regulators (or monitoring units) uses fixed length frames, that of some uses variable length frames and that of others uses conditionally variable length frames. The frame telegram checking of APSTOMB using the magnetic resonance system multidrop bus communication method of the invention is established on the link layer, and simplifies the design of a frame telegram checking-out unit. A variable length frame is identified by means of an end character, and a fixed length frame is identified by using a state count. The frame telegram checking-out unit identifies a conditionally variable length frame by means of an end character if there is an end character, and relies on a state count if there is no end character. Therefore, with a set field combination, different protocols can check out telegrams by means of state machines. In order to ensure robustness and a response speed, the state machine state definitions and transition conditions are determined by analysis and tests.

State machines operate on communication link circuits, and communication link circuit state machines have two operating modes, one being a detection mode, and one a service mode.

In the service mode, state machines have a number of main states for checking-out service operation feedback telegrams, these states comprising SVC_SENDING, SVC_WAITING_STX, SVC_CHECKING_ADDR1, SVC_CHECKING_ADDR0, SVC_COUNTING_END_LEN, SVC_CHECKING_END_ETX, SVC_CHECKING_END_DELIMITER, RECV_OVERRUN etc.

In the detection mode, state machines have a number of main states for detecting operation feedback telegrams, these states comprising PROBE_WAITING_STX, PROBE_CHECKING_VALID, PROBE_VALIDATED, PROBE_SENDING, PROBE_OVERRUN etc.

The service mode uses "start character-address word" two-axis orthogonal checking-out, and, by an ergodic operation on SVC_WAITING_STX, SVC_CHECKING-ADDR1, SVC_CHECKING_ADDR0 a frame telegram checking-out unit can find a specific channel in the information space.

The detection mode uses "start character-valid word" two-axis convolutional checking-out, and, by an ergodic operation on PROBE_WAITING_STX, PROBE_CHECKING_VALID_PROBE_VALIDATED a frame telegram checking-out unit can confirm the validity of a feedback telegram.

The two forms of checking-out described above have been designed in order to support immediate turn-on and immediate turn-off, and also because the system needs to have a certain communication fault tolerance capacity. In the communication link circuits here, one is interested in communication between elements, and one is not interested in Sub-Addr. The respective individual checking-out locations in the two modes can be represented in a three-dimensional stereo-space; see FIG. 7. FIG. 7 clearly delineates the difference between the two modes. In the service mode, it can be confirmed from a fixed Stx-UnitNo pair that a regulator has entered a communication state, and a telegram starting from an orthogonal point can be received; see the service frame telegram check-out point in the drawing. As distinct from the service layer, the object of designing the detection mode is to increase the search range. The error tolerance capacity provided this mode helps to locate faults and it also helps to remove certain "soft" faults (such as when some field formats have what may be incorrect layouts). A logical channel which it is wished to detect is already mapped on a main address, and so the detection is limited to the vertical on the plane of the address axis. Any start characters produced at designated addresses can be received, but the validity of telegrams must be confirmed on the validity key axis. The Stx set and Validity set in the drawing indicate a convolution boundary, and form a detection-checking-out set. When a particular fault needs to be eliminated, there can be 3 types of problem: (1) it cannot be checked out, (2) detection succeeds but analysis fails, (3) analysis succeeds but data errors are returned. In most circumstances, analysis conducted with the assistance of the two modes makes it possible to locate problems accurately.

For a drive routine attempt in the detection mode, a detection string described by APSTOMB using the magnetic resonance system multidrop bus communication method according to the invention makes a request to an unbound address, but errors or other effects cannot yet be forecast. In the service mode, since a regulator has already been detected, the operation generally assumes that a response can be anticipated. Compared to the service mode, the detection mode is designed with quite a strong fault tolerance and recovery capacity, and it can recover rapidly from untimely response operations. Switching of the operating modes makes it possible to conduct detection attempts frequently with comparatively short periods and to shorten the system's self-healing time.

APSTOMB using the magnetic resonance system multidrop bus communication method of the invention can also use a frame characteristic matching technique to identify different regulator (or monitoring unit) types. This frame characteristic matching technique uses 7 types of matching descriptors, comprising matching operators such as same, different, ignore, upper limit and lower limit (4 types), etc. for analysing detection feedback telegrams. Different regulator (or monitoring unit) types can be identified by priority matching calculation procedure. Priority levels can be identified as the result of rational definitions of detection routines.

APSTOMB using the magnetic resonance system multidrop bus communication method of the invention can also effect dynamic frame binding by means of the above described frame telegram checking-out and frame characteristic matching. Once a certain regulator (or monitoring unit) has been identified, the protocol frame type of this regulator (or monitoring unit) can be bound to a particular address. A main regulator has a list table of the frame types of regulators (or monitoring units) which have already been managed, and, when it connects to and accesses the relevant address, it can use the frame type to compose a telegram.

APSTOMB using the magnetic resonance system multidrop bus communication method of the invention achieves the following advantages through the above described measures.

The start character and address binding reduces the probability of telegram losses being caused by communication protocol code set conflicts, and so more types of regulators (or monitoring units) can work together on the bus. It is not necessary for all the regulators (or monitoring units) to use the same frame synchronization word. Even regulators (or monitoring units) whose service frame format definitions are different can work together. During normal work, a state machine of a protocol stack can effect gate control opening accurately. In a situation in which a fault occurs in communication with a particular regulator (or monitoring unit) or there is regulator (or monitoring unit) address conflict, a telegram may be incomplete or incorrect, because of effects on the bus. If it is detected that gate control has not been opened, then there is a loss of a maximum of 3 bytes. If it is detected that gate control has been opened, the next request made to the address in question loses a maximum of 1 complete telegram.

Adaptive protocol matching is achieved by the use of a two-layer frame structure and frame binding system. Requesters do not need to be concerned with communication formats. A composer determines the communication format and composes a necessary request telegram on the basis of the type of regulator (or monitoring unit) which is accessed or analyses a received feedback telegram.

Logical independence of channels is achieved by the use of an "address+sub-address" binding system. An indication is given by a regulator (or monitoring unit) ID which goes through a channel. In the case of a control channel which contains many addresses, automatic mapping of a logical channel ID on a main address and sub-address is effected. The requester does not need to be concerned about the regulator's (or monitoring unit's) address to which a call is made. The sub-address can be automatically inserted into the service layer.

The use of a service script to describe various types of accessing work of regulators (or monitoring units) makes it possible for interfaces with the same parameters to be offered to regulators (or monitoring units) of different types by application software. The service script can adapt flexible parameter formats and be easily operation-oriented, and can provide the exterior with interfaces which are irrespective of devices.

The frame characteristic matching technique permits one to construct patterns for regulator (or monitoring unit) characteristics by using a detection script, and it makes it possible to detect automatically whether calls have been put through to regulators (or monitoring units). Also, distinctions between various different types are made by priority matching calculation procedure. The priority matching calculation procedure effects analysis in respect of response frames, and, if certain regulators (or monitoring units) do not provide their types, it can implement type enquiry operations and so can still identify the types of a variety of regulators (or monitoring units).

Dynamic frame type binding can isolate the effects of faults, in addition to which the system can be self-healing. When a communication gives rise to a fault, the channel which produced the communication fault is labelled, and the bound frame type is dynamically erased. In such a situation, if the functions of regulators (or monitoring units) are still normal, these regulators (or monitoring units) can still operate offline, and so there are not liable to be effects on the operation of the entire system, and the fault level can be lowered. When communication recovers, the relevant regulator (or monitoring unit) is automatically detected and identified, and then binding of the frame type of this regulator (or monitoring unit) is effected, the regulator (or monitoring unit) recovers and comes online, and the system self-heals.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method of communication on a multidrop bus of a magnetic resonance system, employing an adaptive protocol script for telegrams on said multidrop bus comprising the steps of: with said adaptive protocol script for telegrams on said multidrop bus, implementing adaptive protocol matching using telegram start characters, addresses and frame type binding; decomposing a telegram frame into a device-based link layer and a service layer; using said link layer for differentiating addresses and frame types and enabling devices which use different communication protocols to be simultaneously present on said bus; and said service layer constituting a load of said link layer and service script that is operation-based and that provides providing, for the exterior interfaces which are independent of the communication protocols which are used by said devices.

2. The method of communication on a multidrop bus of a magnetic resonance system as claimed in claim 1 comprising, with a composer, determining telegram headers on the basis of said start characters and addresses.

3. The method of communication on a multidrop bus of a magnetic resonance system as claimed in claim 1 comprising, with said link layer, for confirming completeness of telegrams.

4. The method of communication on a multidrop bus of a magnetic resonance system as claimed in claim 1 wherein a frame of said link layer comprises a start character field, and using said start character for identifying the start of a telegram; at a time of transmission, with a composer, inserting a correct start character in the telegram head portion; and, when preparation for reception is complete, using a valid start character to indicate start of a telegram.

5. The method of communication on a multidrop bus of a magnetic resonance system as claimed in claim 4 wherein said link layer's frame comprises a unit address field, and using said unit address field to indicate the address of a logical channel.

6. The method of communication on a multidrop bus of a magnetic resonance system as claimed in claim 5, wherein the frame of said link layer comprises a service layer load field, using a text thereto to indicate a work request of a regulator or a return result, and, at a time of transmission, inserting, with the composer the complete load text into the service layer load field of a telegram.

7. The method of communication on a multidrop bus of a magnetic resonance system as claimed in claim 6 wherein the frame of said link layer comprises a main text end character field, and using said main text end character field to indicate that a service layer load field has ended, and, at a time of reception, using an analyzer to scan to as far as the main text end character, and thereby extract the service layer load.

8. The method of communication on a multidrop bus of a magnetic resonance system as claimed in claim 7 said frame of said link comprises a frame check word field, and using said frame check work field to confirm the correctness of the relevant frame telegram.

9. The method of communication on a multidrop bus of a magnetic resonance system as claimed in claim 8 wherein the frame of said link comprises a telegram end character field, and using said telegram and character field to indicate the end of a complete telegram.

10. The method of communication on a multidrop bus of a magnetic resonance system as claimed in claim 9 comprising dividing said service layer into two types, designated request telegrams and feedback telegrams, dependent on the direction of the telegram in which the service layer is present.

11. The method of communication on a multidrop bus of a magnetic resonance system as claimed in claim 10 wherein said request telegrams and feedback telegrams comprise address fields, and using said address fields to support plural channels.

12. The method of communication on a multidrop bus of a magnetic resonance system as claimed in claim 10 wherein said request telegrams and feedback telegrams comprise service type fields, and using said service type fields to indicate service types.

13. The method of communication on a multidrop bus of a magnetic resonance system as claimed in claim 10 wherein said request telegrams and feedback telegrams comprise transaction word fields, and using said transaction word fields to indicate service codes.

14. The method of communication on a multidrop bus of a magnetic resonance system as claimed in claim 10 wherein said request telegrams comprise data specification fields, and using said data specification field to designate date specifications carried by service layer requests.

15. The method of communication on a multidrop bus of a magnetic resonance system as claimed in claim 10 wherein said feedback telegrams comprise response code fields, and using said response code fields to indicate types of service response results.

16. The method of communication on a multidrop bus of a magnetic resonance system as claimed in claim 10 when said request telegrams and feedback telegrams comprise flexible data fields, and using said flexible data fields to indicate variable data sections.

17. The method of communication on a multidrop bus of a magnetic resonance system as claimed in claim 16 comprising, at the time of telegram composition, producing a telegram by a series of insertion operations, each service layer field corresponds to one insertion operation and composes a service layer load field, and making the service layer fields a composite field and inserting the composite field into said link layer.

18. The method of communication on a multidrop bus of a magnetic resonance system as claimed in claim 17 comprising, at the time of telegram analysis, processing a telegram by a series of extraction operations, each service layer field corresponds to one extraction operation, and extracting the service layer field at the time of service layer load field analysis.

19. The method of communication on a multidrop bus of a magnetic resonance system as claimed in claim 18 comprising, with said adaptive protocol script, further implementing checking-out of telegrams on said link layer.

20. The method of communication on a multidrop bus of a magnetic resonance system as claimed in claim 19 said adaptive protocol script matching in correspondence to checked-out telegrams by operations in order to identify different regulators.

21. The method of communication on a multidrop bus of a magnetic resonance system as claimed in claim 20 comprising when a regulator is identified as the result of checking-out and matching, binding the protocol frame type thereof to an address, and, in a main control unit, storing a list table of regulator frame types, and, when said main control unit connects to and accesses said address said main control unit dynamically binds a telegram based on the frame type thereof.

\* \* \* \* \*